United States Patent
Mizoguchi

(10) Patent No.: US 7,304,706 B2
(45) Date of Patent: Dec. 4, 2007

(54) IPS LIQUID CRYSTAL DISPLAY DEVICE WITH EDGE OF THE PIXEL ELECTRODE, COMMON ELECTRODE, AND SIGNAL LINE HAVING STAIRWISE STEPPED PORTIONS

(75) Inventor: Chikaaki Mizoguchi, Izumi (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 387 days.

(21) Appl. No.: 10/971,045

(22) Filed: Oct. 25, 2004

(65) Prior Publication Data
US 2005/0088600 A1   Apr. 28, 2005

(30) Foreign Application Priority Data
Oct. 24, 2003   (JP)   ............................. 2003-364837

(51) Int. Cl.
*G02F 1/1343*   (2006.01)
(52) U.S. Cl. .................. 349/141; 349/139; 349/145
(58) Field of Classification Search ................ 349/141, 349/145
See application file for complete search history.

(56) References Cited

U.S. PATENT DOCUMENTS

| | | | | |
|---|---|---|---|---|
| 5,905,556 | A * | 5/1999 | Suzuki et al. ................ | 349/141 |
| 6,542,212 | B2 * | 4/2003 | Yoshida et al. .............. | 349/141 |
| 6,917,406 | B2 * | 7/2005 | Yang ............................ | 349/139 |
| 2003/0107697 | A1 * | 6/2003 | Yang et al. .................. | 349/141 |
| 2003/0179333 | A1 * | 9/2003 | Kim ............................. | 349/139 |
| 2004/0200575 | A1 * | 10/2004 | Bietsch et al. .......... | 156/345.11 |

FOREIGN PATENT DOCUMENTS

JP   10-148826   6/1998

* cited by examiner

*Primary Examiner*—Andrew Schechter
(74) *Attorney, Agent, or Firm*—Young & Thompson

(57) ABSTRACT

In an IPS liquid crystal display device, a reduction in optical leakage from the outer peripheral portion of an electrode pattern in flexed configuration and an improvement in the contrast of display on a screen are intended. The IPS liquid crystal display device has a plurality of signal lines and scan lines arranged as a matrix on a TFT substrate, TFT switching elements, and comb-like pixel electrodes connected to the TFT switching elements. In a pixel region, a comb-like common electrode is formed in interdigitated relation with the pixel electrodes. The pixel electrodes, the common electrode, and the signal lines are formed in mutually parallel and flexed configuration at a given angle relative to an optical axis. The outer edge of each pixel electrode, the common electrode, and the signal lines is added with fine stairwise fine stepped portions composed of the same material as composing the electrodes and lines.

9 Claims, 6 Drawing Sheets

IPS LIQUID CRYSTAL DISPLAY DEVICE WITH EDGE OF THE PIXEL ELECTRODE, COMMON ELECTRODE, AND SIGNAL LINE HAVING STAIRWISE STEPPED PORTIONS

BACKGROUND OF THE INVENTION

1. Field of the Invention

The present invention relates to an IPS (In-Plane Switching) liquid crystal display device and, more particularly, to a pattern structure of electrodes and wiring in the pixel region of the IPS liquid crystal display device.

2. Description of the Prior Art

In an IPS liquid crystal display device, a liquid crystal is sealed in a space between a pair of transparent substrates and an electric field substantially parallel to a surface of one of these substrates is applied thereto, whereby liquid crystal molecules are rotated and oriented in a direction horizontal to the substrate surface. The IPS liquid crystal display device can achieve a wide viewing angle by orienting the liquid crystal molecules in a direction horizontal to the substrate surface.

Pixel electrodes and a common electrode which are formed at a given spacing are arranged in a comb-like configuration on the transparent substrate to which the electric field is applied in parallel relation. By applying a voltage between the pixel electrodes and the common electrode, an electric field parallel to the substrate surface is generated. In the IPS liquid crystal display device, therefore, display is constantly viewed only from a direction in which the short axes of the liquid crystal molecules extend so that the viewing angle is extremely widened.

Thus, the IPS liquid crystal display device has the advantage of the extremely wide viewing angle, while having the disadvantage that a screen is tinted in a yellow or blue color when viewed in a tilted fashion from the longitudinal direction of the electrodes in the comb-like configuration. To solve the problem, Japanese Laid-Open Patent Publication No. Hei 10-148826 discloses a structure in which each of the electrodes in the comb-like configuration is flexed, as shown in a plan view of a pixel region of FIG. 1.

Referring to FIG. 1, TFT switching elements 109 are provided at the individual points of intersection of a plurality of signal lines 101 and scan lines 108 which are arranged as a matrix. A pixel electrode 106 and a common electrode 107 are formed in a comb-like and interdigitated configuration. These electrodes are connected to the TFT switching elements 109. The pixel electrode 106, the common electrode 107, and the signal lines 101 are formed in flexed and mutually parallel configuration.

In the respective regions upper and lower than the bent portions of the flexed electrodes, a liquid crystal is tinted in yellow and blue colors when the screen is viewed in a tilted fashion from the longitudinal direction of the flexed electrodes during the application of a voltage. As a result, the color changes relative to the viewing angle are mutually compensated for so that an image with no color change is obtainable.

In the multi-domain IPS liquid crystal display device having the flexed electrode pattern structure, however, outer peripheral configuration (edge pattern) of each of the electrodes in the pixel region thereof is directly linear and is not parallel or orthogonal to the optical axis of a polarizer plate. Consequently, diffracted light having a polarized light component which is not absorbed by an analyzer (polarizer plate) is generated by the outer peripheral portion (edge portion), so that optical leakage occurs. Thus, the liquid crystal display device has the problem that the optical leakage increases dark brightness and degrades contrast.

A description will be given to the problem with reference to FIGS. 2A and 2B. FIG. 2A is a plan view diagrammatically showing the pixel region in the absence of optical leakage. FIG. 2B is a diagrammatical plan view illustrating the state of optical leakage in the pixel region.

As shown in FIG. 2A, a comb-like electrode 102 having a conventional structure is composed of the pixel electrode 106 and the common electrode 107, as shown in FIG. 1, while composing a flexed electrode 103 in conjunction with the signal line 101. The flexed electrodes 103 has a pattern structure in which each of the comb-like electrode 102 and the signal line 101 is flexed. Since the flexed electrode 103 in the pixel region is made of a metal material such as Cr, the portion corresponding to the flexed electrode 103 does not transmit light.

Although dark display (the state in which a voltage is not applied between the pixel electrode 106 and the common electrode 107) is actually performed in the pixel region, optical leakage is observed around the outer peripheral portion of the flexed electrode 103, which serves as a factor causing lower contrast.

Since the electrode edge portion is not parallel or orthogonal to the optical axis 104 in the conventional flexed electrode 3, as shown in FIG. 2B, the diffraction of light by the electrode edge portion causes optical leakage 105 between crossed nicols. As a result, dark brightness increases and contrast deteriorates. Thus, the metal electrode which is not orthogonal or parallel to the optical axis 104 has the problem that the outer peripheral portion thereof generates a polarized light component which is not absorbed by the analyzer as a result of diffraction and increases the dark brightness.

This indicates that an amount of optical leakage increases as a tilt angle θ (θ represents an angle shown in FIG. 6B) between wiring and optical axis approaches 45 degrees but becomes 0 at each of 0 and 90 degrees, as shown in FIG. 3. The graph of FIG. 3 was obtained by experiment by the present inventors et al. As an optimal value of the tilt angle θ, 15 degrees is normally set.

SUMMARY OF THE INVENTION

The present invention has been achieved to solve the foregoing problems and it is therefore an object of the present invention to reduce optical leakage from the outer peripheral portion (edge portion) of a tilted electrode pattern and thereby improve contrast in an IPS liquid crystal display device having a flexed electrode pattern structure.

An IPS liquid crystal display device having a flexed electrode pattern structure according to the present invention comprises a plurality of signal lines and scan lines arranged as a matrix on a first substrate. TFT switching elements are provided at the individual points of intersection of the signal lines and the scan lines on the first substrate. A comb-like pixel electrode and a comb-like common electrode are connected to the TFT switching elements. The pixel electrode and the common electrode are arranged in interdigitated relation. A second substrate (not shown) is disposed in opposing relation to the first substrate. A liquid crystal layer is inserted between the first and second substrates, while respective polarizer plates are disposed outside of the first and second substrates. A comb-like electrode composed of the pixel electrode and the common electrode and a signal line have a flexed electrode pattern structure. The outer peripheral configuration of each of the comb-like electrode and the signal line which are formed in flexed configuration is composed of stairwise fine steps.

In accordance with the present invention, each of the comb-like electrode and the signal line is formed to have an outer peripheral configuration such that each of the angular portions of the steps is located at a position not reaching beyond half the spacing between the pixel electrode and the common electrode composing the comb-like electrode in parallel relation. The two edges composing each of the steps are composed of the edge orthogonal to the optical axis and the edge parallel to the optical axis.

In accordance with the present invention, the tilt angle of each of the comb-like electrode and the signal line relative to the optical axis is not less than 10 degrees. Each of the comb-like electrode and the signal line is composed of a metal material such as Cr. The comb-like electrode may also be composed of a transparent electrode.

In the conventional IPS liquid crystal display device, the electrode pattern which is not orthogonal or parallel to the optical axis had the problem that the outer peripheral portion thereof generates a polarized light component which is not absorbed by the analyzer as a result of diffraction and thereby increases the dark brightness. By contrast, the foregoing electrode pattern structure according to the present invention shuts off the diffracted light at each of the stepped portions, eliminates optical leakage from the outer peripheral portion of the electrode-pattern, and thereby improves the contrast of display on a screen.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 4A:
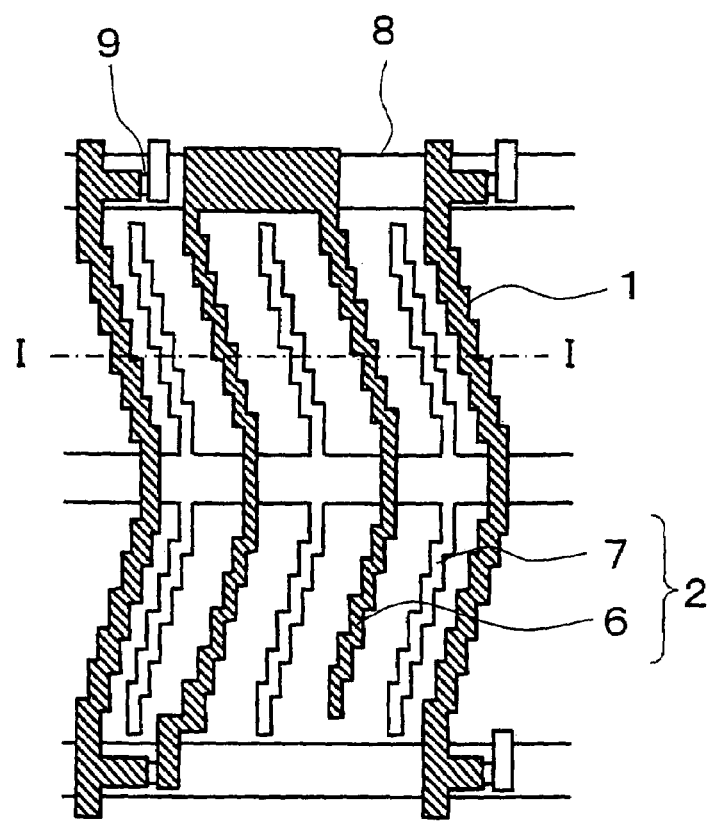
FIG. 4A is a plan view diagrammatically showing the pixel region of an IPS liquid crystal display device having an electrode pattern structure according to the present invention.
Figure 4B:
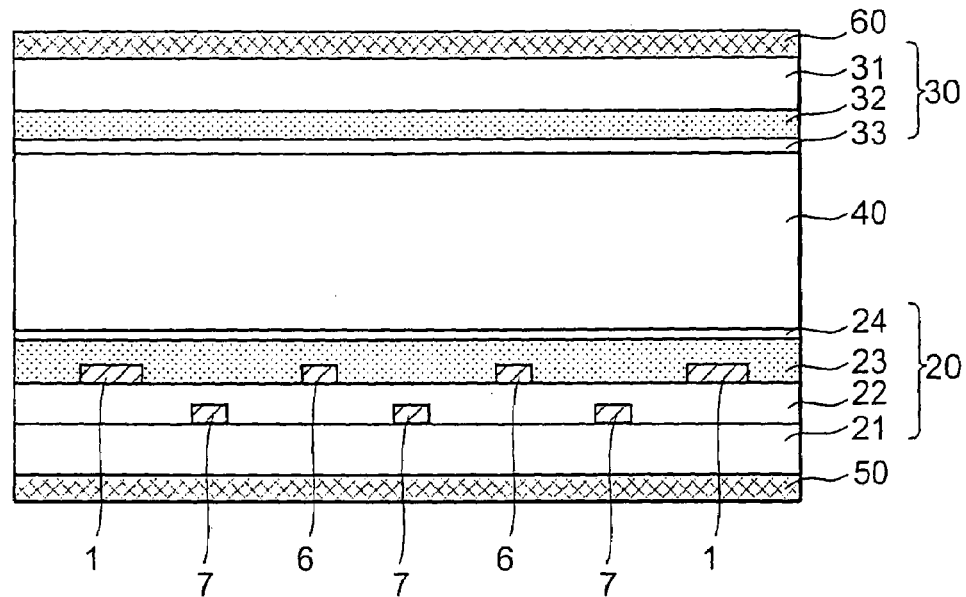
FIG. 4B is a sectional view of a liquid crystal display panel taken along line I-I of FIG. 4A.

Referring to the drawings, the embodiments of the present invention will be described herein below. FIG. 4A is a plan view diagrammatically showing the pixel region of an IPS liquid crystal display device having an electrode pattern structure according to the present invention. FIG. 4B is a sectional view of a liquid crystal display panel taken along line I-I of FIG. 4A.

Figure 5:
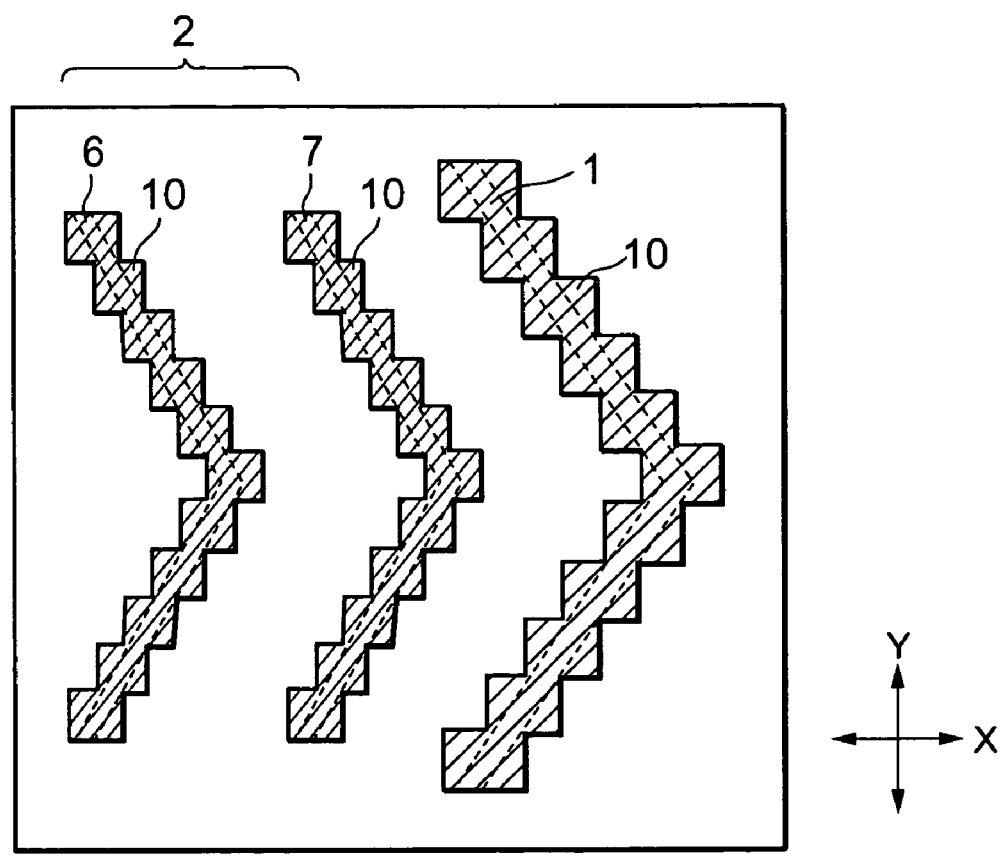
FIG. 5 is an enlarged plan view of the electrode pattern in the pixel region of FIG. 4.

FIG. 5 is an enlarged plan view of the electrode pattern in the pixel region of FIG. 4A.

As shown in FIG. 4A and FIG. 4B, the IPS liquid crystal display device according to the present invention comprises a plurality of signal lines 1 and scan lines 8 arranged as a matrix on a first substrate 20. TFT switching elements 9 are provided at the individual points of intersection of the signal lines 1 and the scan lines 8 on the first substrate. Comb-like pixel electrodes 6 and a comb-like common electrode 7 are connected to the TFT switching elements 9. The pixel electrodes 6 and the common electrode 7 are arranged in interdigitated relation. A second substrate 30 is disposed in opposing relation to the first substrate 20. A liquid crystal layer 40 is inserted between the first substrate 20 and second substrate 30. Respective polarizer plates (shown by reference letters 50 and 60) are further disposed outside of the first substrate 20 and the second substrate 30. Reference letters 21 and 31 of FIG. 4B show the transparent substrate such as the glass. Reference letters 22 are insulating layers such as SiN. Moreover, reference letters 23 and 32 are overcoat layers made of a transparent resin such as the acryl resins, and reference letters 24 and 33 show the oriented film made of the polyimide etc. A comb-like electrode 2 composed of the pixel electrode 6 and the common electrode 7 and the signal line 1 have a flexed electrode pattern structure.

A description will be given to the structure of this electrode pattern with reference to FIG. 5. In the electrode pattern in the pixel region according to the present invention, the outer edge of each of the comb-like electrode 2 and the signal line 1 formed in flexed configuration is added with fine stairwise stepped portions 10, as shown in FIG. 5. The stepped portions 10 added to the comb-like electrode 2 and the signal line are formed integrally therewith by a photolithographic technology using the same material as composing these electrode and line. The stepped portions of the outer peripheral portions of the signal line 1 and the comb-like electrode 2 in the pixel region are composed of a sequence of fine steps each composed of two respective edges which are orthogonal (X-direction) and parallel (Y-direction) to an optical axis. The steps are formed such that each of the two edges composing the fine steps has a dimension smaller than the spacing between the pixel electrode 6 and the common electrode 7 composing the comb-like electrode 2 in parallel relation. Each of the angular portions of the stepped portions 10 is located at a position not reaching beyond half the spacing between the pixel electrode 6 and the common electrode 7 composing the comb-like electrode in parallel relation.

A description will be given next to an example of a method for forming the flexed electrode pattern according to the present invention. The scan lines (gate lines) and the common electrode are formed on a transparent substrate such as a glass substrate. The scan lines and the common electrode are formed by patterning a Cr film deposited on the transparent substrate by sputtering.

Next, an insulating film made of SiN or the like, an amorphous silicon film, and a doped amorphous silicon film are deposited successively on the transparent substrate. Semiconductor layers for the TFTs are formed by patterning the amorphous silicon film and the doped amorphous silicon film. Subsequently, a metal material of Cr or the like is deposited over the entire surface of the transparent substrate and patterned so that source/drain electrodes are formed, while the pixel electrodes and the signal lines are formed simultaneously, whereby the TFT substrate is fabricated. The pixel electrodes and the common electrode are formed in flexed and comb-like configuration. The signal lines 1 are also formed in flexed and parallel relation to the comb-like electrodes 2. Besides Cr, any of Al, Mo, Ta, Ti, W, Nb, Fe, Co, Ni, an alloy thereof, and the like may be used as the material of each of the scan lines, the common electrode, the signal lines, and the pixel electrodes.

Figure 6:
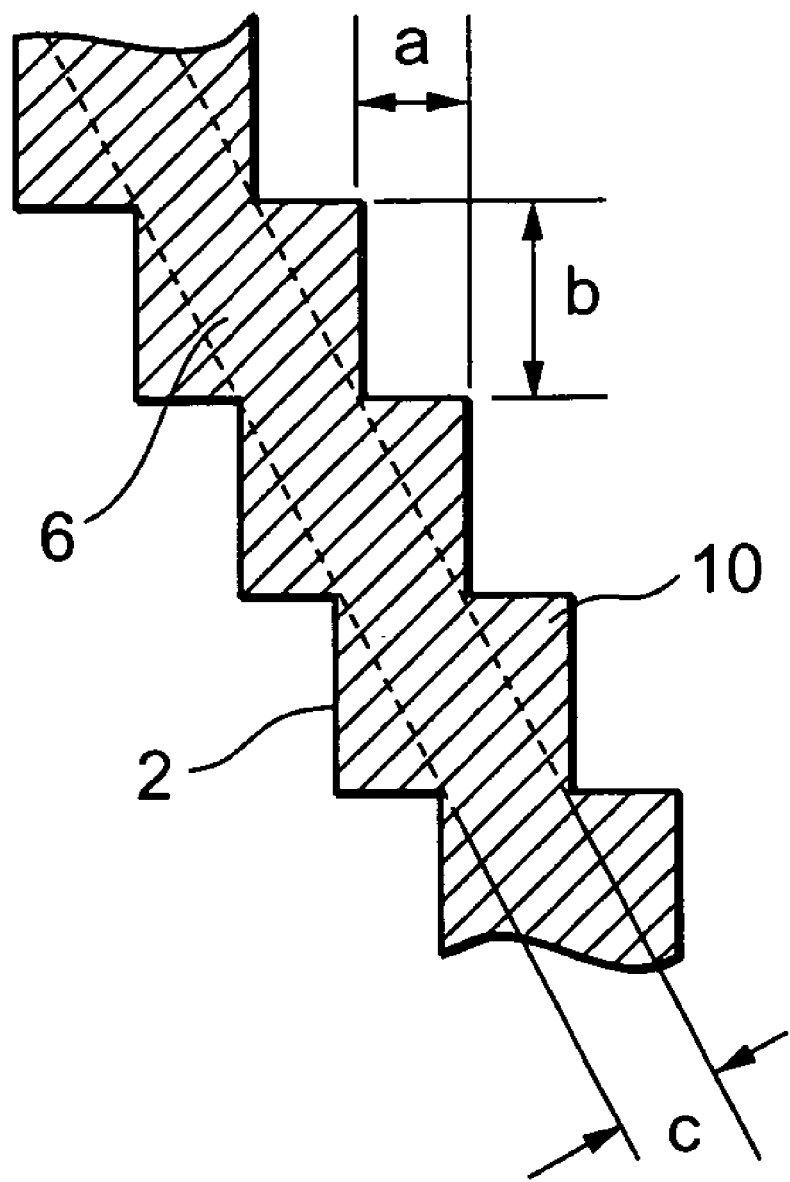
FIG. 6 is a detailed partial view of FIG. 5.

When the signal lines and the comb-like electrodes are thus formed by using a photolithographic technology, the outer edge of the flexed electrode is added with fine stepped portions. FIG. 6 shows an enlarged view of the comb-like electrode 2 of FIG. 5, in which Lc represents the width of the comb-like electrode 2 and La and Lb represent the width (in a direction orthogonal to the optical axis) and height (in a direction parallel to the optical axis) of each of the stepped portions 10. As an example of these dimensions, Lc=5 μm, La=5 μm, and Lb=10 μm can be listed. In this case, the tilt angle θ of the comb-like electrode 2 relative to the optical axis has been adjusted to about 27 degrees.

In the IPS liquid crystal display device, a bi-directional oblique electric field is generated between the comb-like electrodes by a potential imparted between the comb-like electrodes, which orients a liquid crystal in a direction parallel to the electric field and allows a multi-domain in-plane switching operation. That is, even when the outer edge of each of the comb-like, electrodes is configured to have fine stepped portions as shown in FIG. 5 according to the present invention, the average direction of the electric field is oblique two directions so that a normal switching operation is enabled.

In the flexed comb-like electrode having the conventional structure, the outer peripheral portion of the electrode pattern is composed of a direct line tilted relative to the optical axis which is neither orthogonal nor parallel to the optical axis so that optical leakage due to diffraction has occurred at the outer peripheral portion of the electrode pattern. By contrast, the outer edge of the electrode pattern of the flexed comb-like electrode according to the present invention is configured to have additional fine stepped portions each having a tilt angle of 0 degrees (parallel to the optical axis) and 90 degrees (orthogonal to the optical axis) between wiring and optical axis so that optical leakage from the outer peripheral portion (edge portion) of the electrode pattern is prevented. By thus adding the fine stepped portions smaller than the spacing between the electrodes to the outer edge of the electrode pattern, the generation of a polarized light component due to diffraction is prevented. In the flexed comb-like electrodes according to the present invention, therefore, optical leakage from the outer peripheral portion of the electrode pattern can be prevented and the contrast of display on the screen of the liquid crystal display device can be improved.

Figure 1:
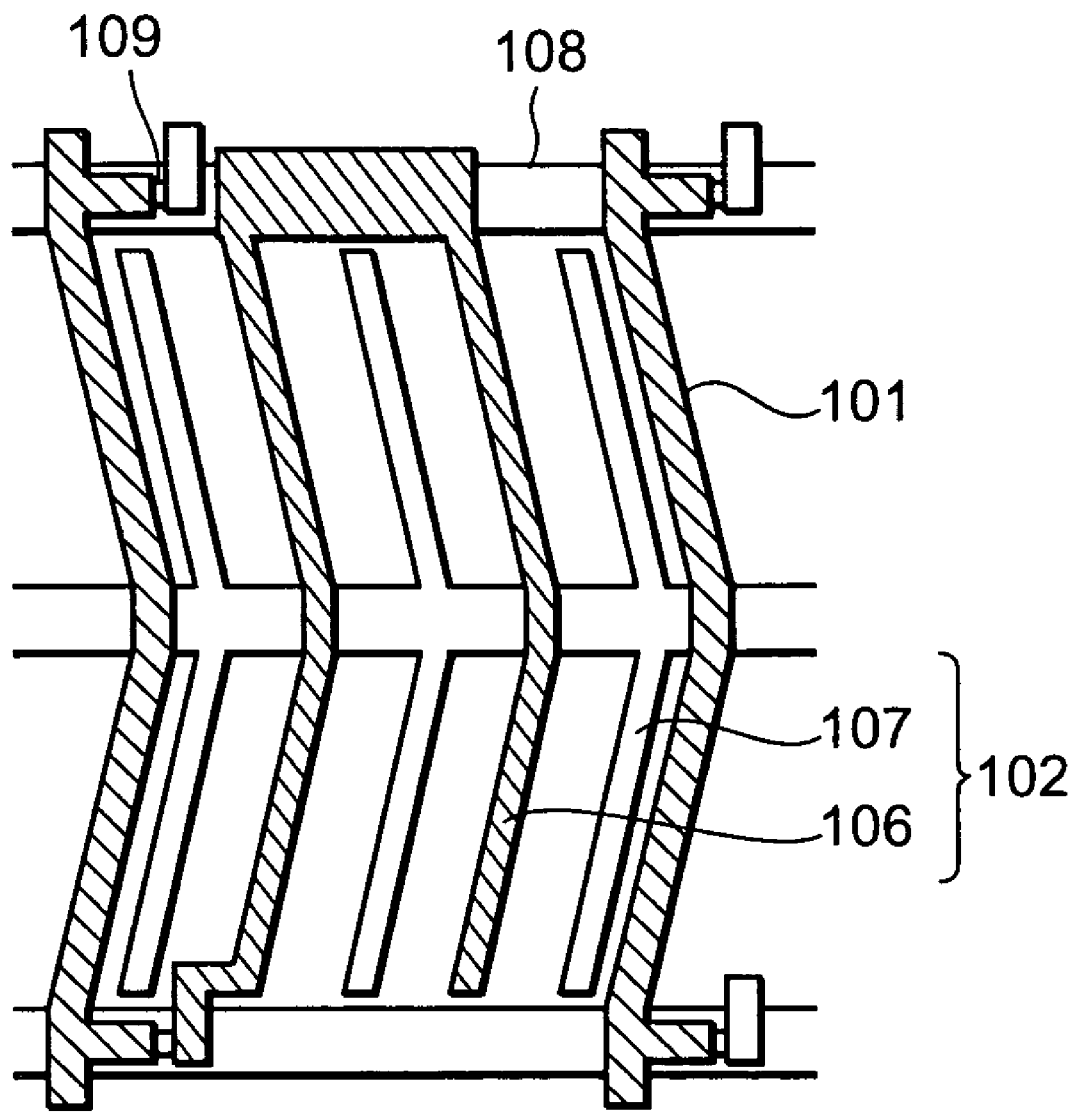
FIG. 1 is a plan view illustrating the pixel region of a conventional IPS liquid crystal display device.
Figure 2A:
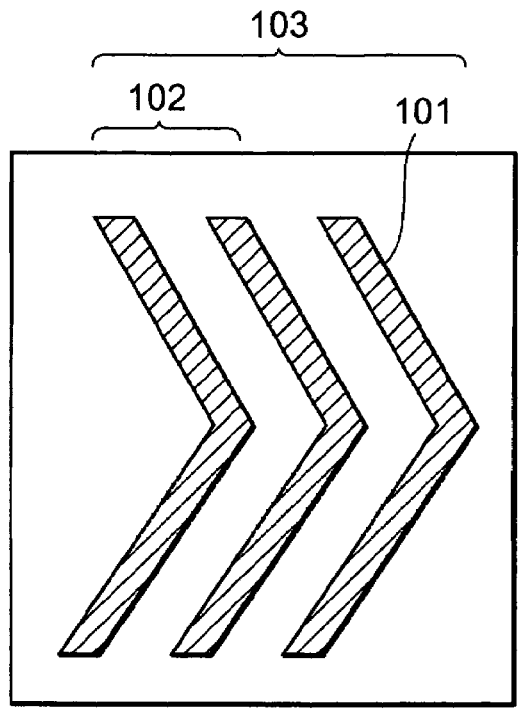
FIG. 2A is a plan view diagrammatically showing the pixel region of FIG. 1 in which the optical leakage is not observed.
Figure 2B:
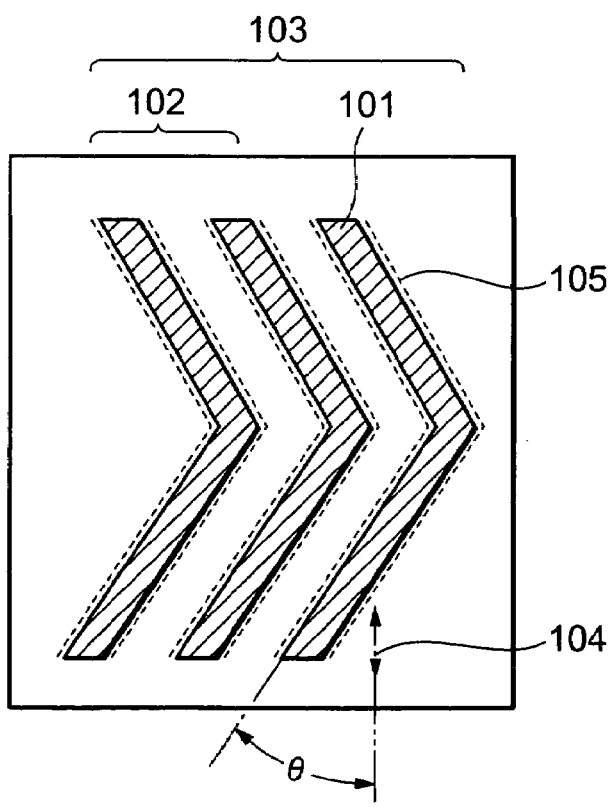
FIG. 2B is a plan view diagrammatically showing the pixel region of FIG. 1 in which the optical leakage is observed.
Figure 3:
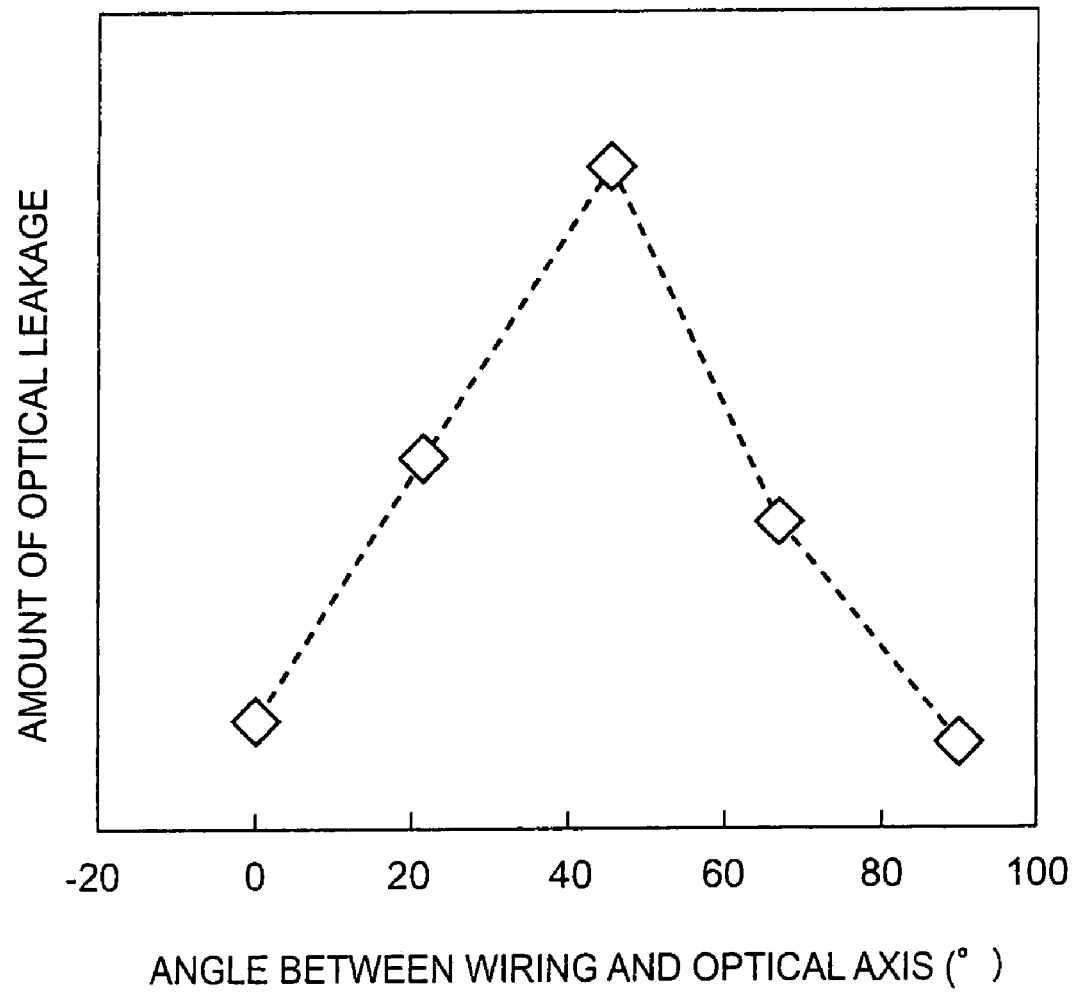
FIG. 3 is a graph illustrating optical leakage from the electrode portion of the conventional IPS liquid crystal display device.

The present invention can achieve the same effects if a transparent electrode material such as ITO (Indium-Tin Oxide) is used instead of a metal material such as Cr for the comb-like electrodes. However, a material other than metal cannot be used for the scan electrodes because it increases wiring resistance. As can be seen from FIG. 3, an amount of optical leakage can also be reduced by reducing the tilt angle of the electrode pattern relative to the optical axis. However, since a reduction in tilt angle causes the problems of increased threshold, enlarged disclination occurring at a domain boundary, and the like, the tilt angle θ is preferably adjusted to 10 degrees or more.

Since the present invention can prevent the optical leakage from the edge portion of the electrode pattern in the IPS liquid crystal display device, it becomes possible to lower the dark brightness of the screen and improve the contrast thereof. This allows the provision of a high-quality liquid crystal image with a wide viewing angle.

While the present invention has been described in connection with certain preferred embodiments, it is to be understood that the subject matter encompassed by way of the present invention is not to be limited to those specific embodiments. On the contrary, it is intended for the subject matter of the invention to include all alternative, modification and equivalents as can be included within the spirit and scope of the following claims.

What is claimed is:

1. An IPS liquid crystal display device comprising:
a first substrate;
a second substrate disposed in opposing relation to said first substrate;
a liquid crystal layer inserted between said first and second substrates; and
a polarizer plate disposed outside of each of said first and second substrates, wherein
said first substrate includes a plurality of signal lines and scan lines arranged as a matrix thereon, a TFT switching element provided at each of points of intersection of said signal lines and said scan lines, a comb-like pixel electrode connected to said TFT switching element, and a comb-like common electrode formed in interdigitated relation with said pixel electrode, said pixel electrode, said common electrode, and said signal lines have a pattern structure in which they are formed in flexed and mutually parallel configuration, and an outer edge of each of said pixel electrode, said common electrode, and said signal lines formed in said flexed configuration is added with stairwise stepped portions.

2. An IPS liquid crystal display device according to claim 1, wherein an angular portion of each of said stepped portions of each of said pixel electrode, said common electrode, and said signal lines is located at a position not reaching beyond half a spacing between said pixel electrode and said common electrode.

3. An IPS liquid crystal display device according to claim 1, wherein two edges composing each of said stepped portions of said pixel electrode, said common electrode, and said signal lines are composed of two respective edges orthogonal and parallel to an optical axis.

4. An IPS liquid crystal display device according to claim 1, wherein each of said pixel electrode, said common electrode, and said signal lines has a tilt angle not less than 10 degrees relative to an optical axis.

5. An IPS liquid crystal display device according to claim 1, wherein each of said pixel electrode, said common electrode, and said signal lines is composed of a metal material.

6. An IPS liquid crystal display device according to claim 5, wherein said metal material composing each of said pixel electrode, said common electrode, and said signal lines contains at least one selected from the group consisting of Al, Cr, Mo, Ta, Ti, W, Nb, Fe, Co, Ni, and an alloy thereof.

7. An IPS liquid crystal display device according to claim 1, wherein each of said pixel electrode and said common electrode is composed of a transparent electrode.

8. An IPS liquid crystal display device according to claim 7, wherein each of said pixel electrode and said common electrode is composed of ITO.

9. An IPS liquid crystal display device according to claim 1, wherein said stepped portions added to an outer edge of each of said pixel electrode, said common electrode, and said signal lines formed in flexed configuration are formed integrally with each of said pixel electrode, said common electrode, and said signal lines by a photolithographic technology using the same material as composing each of said pixel electrode, said common electrode, and said signal lines.

* * * * *